April 2, 1968  E. E. HAMILTON  3,375,959
CONVERTIBLE AND DETACHABLE LUGGAGE RACK FOR STATION WAGONS
Filed June 22, 1966  2 Sheets-Sheet 1

Everett E. Hamilton
INVENTOR.

April 2, 1968  E. E. HAMILTON  3,375,959
CONVERTIBLE AND DETACHABLE LUGGAGE RACK FOR STATION WAGONS
Filed June 22, 1966  2 Sheets-Sheet 2
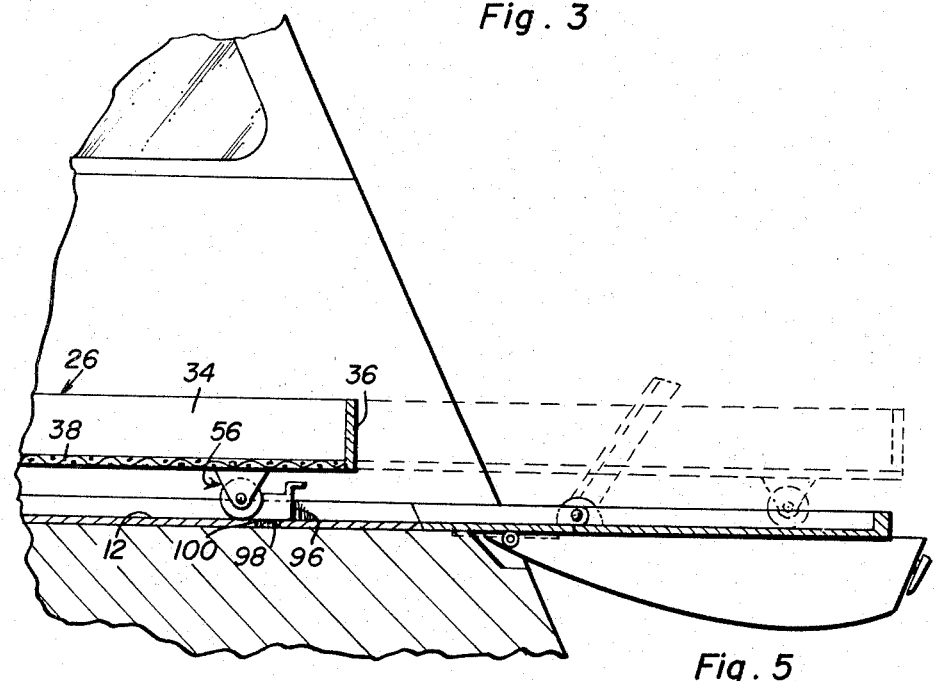
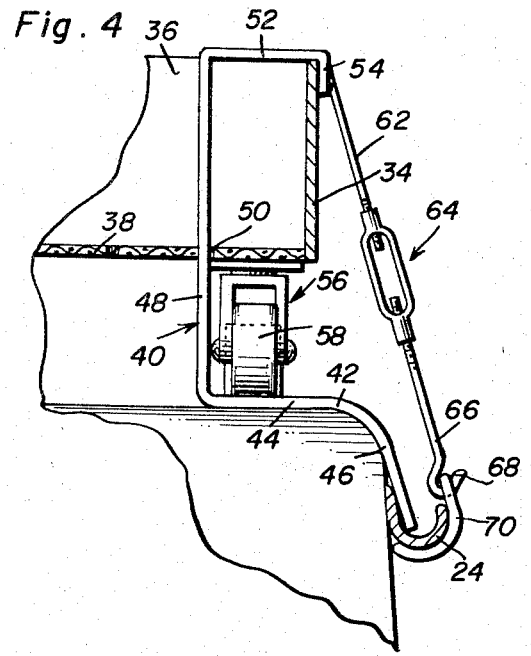
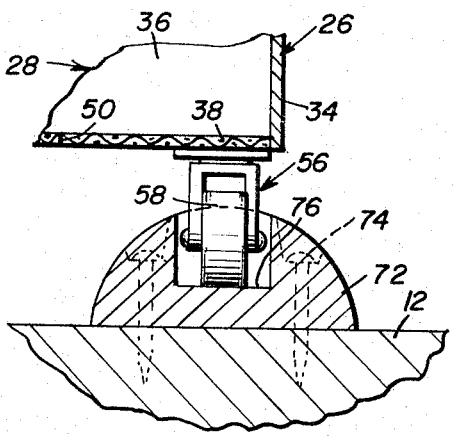
Everett E. Hamilton
INVENTOR.

United States Patent Office 3,375,959
Patented Apr. 2, 1968

3,375,959
CONVERTIBLE AND DETACHABLE LUGGAGE
RACK FOR STATION WAGONS
Everett E. Hamilton, 7550 Canterbury, Drive,
Springfield, Ill. 62707
Filed June 22, 1966, Ser. No. 559,439
7 Claims. (Cl. 224—42.01)

ABSTRACT OF THE DISCLOSURE

A support rack adapted to be carried by a vehicle and to have a load supported therefrom and first and second rack supporting means adapted to be supported from the top and an inner floor portion, respectively, of a vehicle, the first and second rack supporting means and the rack structure including coacting means operative to selectively removably support the rack structure from the first and second rack supporting means against movement relative thereto.

---

This invention relates to a novel and useful detachable storage rack assembly for station wagons and more specifically to a storage rack assembly including a rack structure upon which items to be supported may be placed and first and second rack supporting means, the first rack supporting means being adapted for securement to the top of a vehicle and the second rack supporting means being adapted for securement to the load bed of a vehicle. The rack structure includes means adapting it to be selectively supported from both the first and second rack supporting means as desired.

Although the storage rack assembly of the instant invention may be utilized on numerous types of vehicles, it is primarily designed for use in conjunction with station wagon vehicles including both a top portion on which the first rack supporting means may be secured and a load bed portion upon which the second supporting means may be secured. The rack structure includes depending wheel means for supporting the rack structure from both the first and second rack supporting means and the second rack supporting means, adapted for securement to the load bed of a station wagon, defines track members along which the wheel means are rollingly movable thereby enabling the rack structure to be supported from and moved longitudinally of the second rack supporting means in a manner such that the rack structure may be moved from a position disposed entirely within a station wagon to a position disposed outwardly of the rear end of a station wagon. The second rack supporting means includes track or rail member sections adapted for securement to both the road bed of the station wagon and the inner surface of the tail gate. The rail sections secured to the inner surface of the tail gate include pivotally supported bridging members whereby the spacing between the load bed of the station wagon and the inner surface of the tail gate, when the latter is lowered, may be bridged.

The main object of this invention is to provide a detachable storage rack assembly defining a rack structure for supporting a plurality of articles and adapted for securement to the top of a station wagon as well as for support from and movement longitudinally of the load bed of a station wagon disposed within the interior thereof.

A further object of this invention, in accordance with the immediately preceding object, is to provide a detachable storage rack assembly including rack supporting means adapted for securement to the load bed of a station wagon including those portions of the load bed defining the floor thereof within the station wagon and an extension of the load bed by the upper surface of the tail gate of the station wagon, when the tail gate is in its lowered position, with the rack supporting means defining rail means upon which the rack structure may be supported and along which the rack structure may be moved from a position disposed entirely within the station wagon to a position projecting at least partially outwardly of the rear of the station wagon and disposed above the lowered tail gate thereof.

Another object of this invention, in accordance with the preceding object, is to provide a dettachable storage rack assembly including a rack structure which is adapted to be secured in an immobile position both on the top of an associated vehicle as well as on the load bed of the associated vehicle with in the interior thereof.

A final object of this invention to be specifically enumerated herein is to provide a detachable storage rack assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a fragmentary longitudinal vertical sectional view of the assembly illustrated in FIGURE 1;

Figure 2:
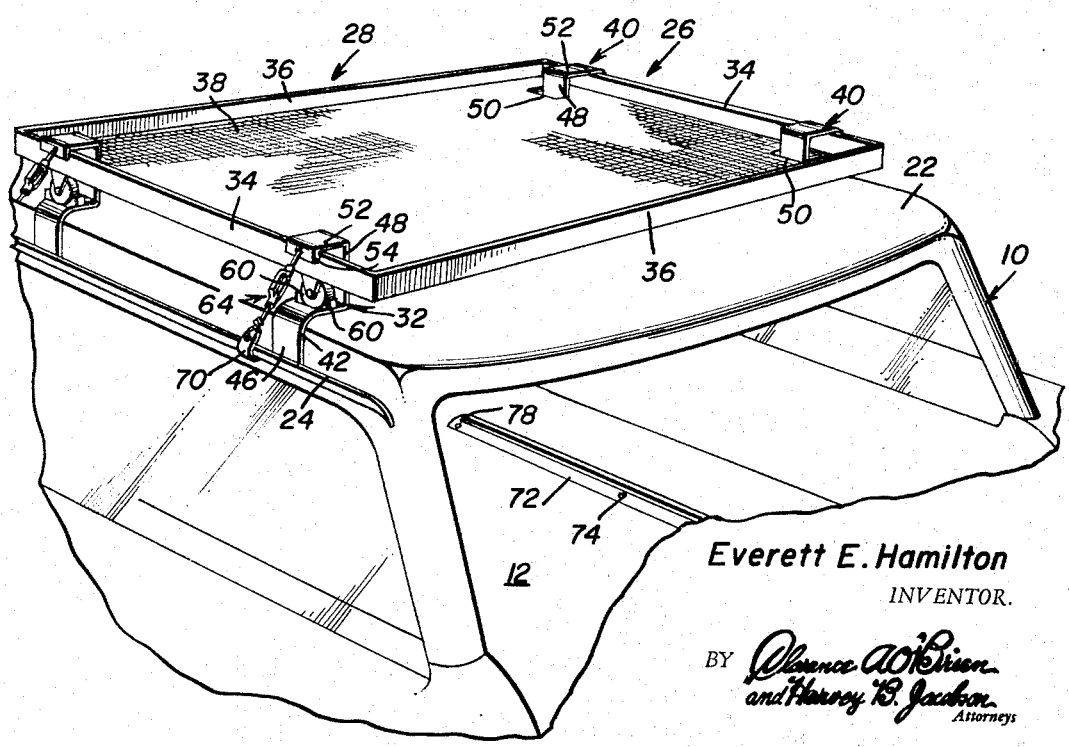
FIGURE 2 is a fragmentary perspective view of the rear portion of the top of the station wagon illustrating the manner in which the rack structure of the instant invention may be supported from the roof or top of the station wagon.

FIGURE 4 is an enlarged fragmentary transverse vertical sectional view of a portion of the assembly as illustrated in FIGURE 2 and illustrating the manner in which the rack structure is supported from and anchored to the top of the station wagon; and FIGURE 5 is a fragmentary enlarged vertical transverse sectional view illustrating the manner in which the rack structure may be rollingly supported from the track means secured to load bed or rear floor portion of the station wagon.

Referring now more specifically to the drawings, the numeral 10 generally designates a conventional station wagon vehicle. The station wagon 10 includes a load bed or rear floor portion 12 which is closed at its rear end by means of a conventional tail gate assembly generally referred to by the reference numeral 14 and pivotally supported from the rear of the station wagon 10 for rotation about a horizontal axis between the open position illustrated in FIGURE 1 of the drawings and a closed position with the free swinging end thereof received between the body portions 16 and 18 of the station wagon 10.

Figure 1:
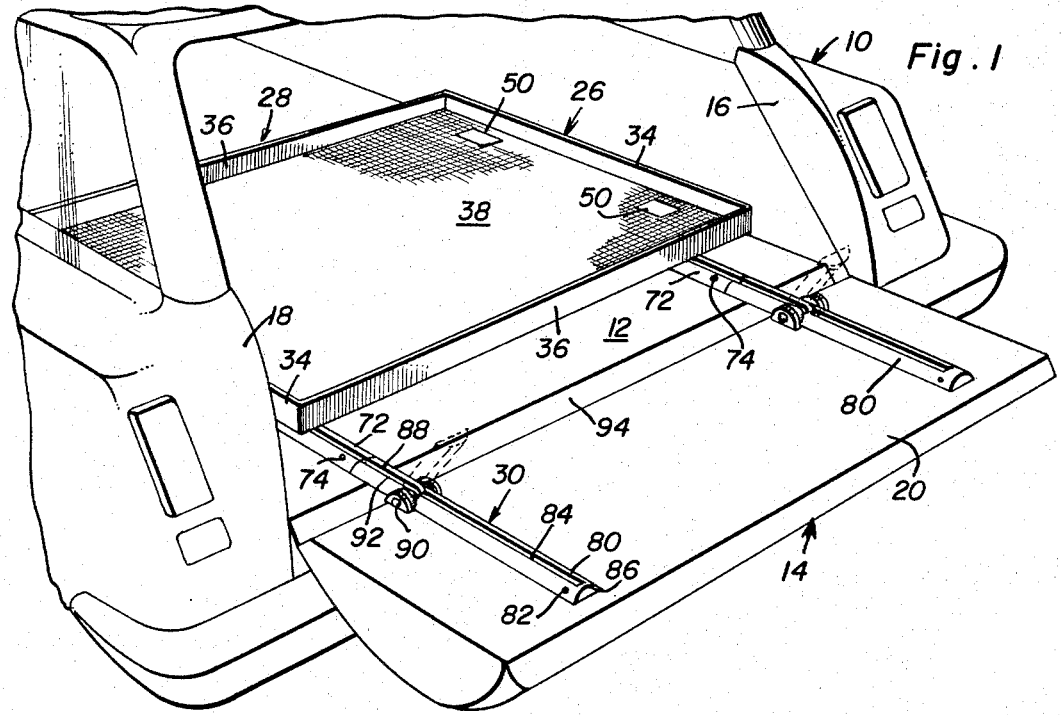
FIGURE 1 is a fragmentary perspective view of the rear end of a conventional form of station wagon shown with the tail gate thereof in a lowered position and the rack structure of the instant invention supported from the load bed of the rear floor portion of the station wagon.

The tail gate assembly 14 includes an inner surface 20 defining a continuation of the load bed 12 when the tail gate 14 is in the open position illustrated in FIGURE 1 of the drawings. Further, it will be noted that the inner surface 20, when the tail gate 14 is in the open position, is spaced slightly rearwardly of the load bed 12.

The station wagon 10 also includes a top 22 along opposite sides of which a pair of rain gutters 24 extend. The rail gutters 24 are secured to the sides of the top 22 in any convenient manner and are part of the original equipment provided with the station wagon 10.

The convertible and detachable luggage rack of the instant invention is generally referred to by the reference numeral 26 and includes a rack structure generally referred to by the reference numeral 28, first rack supporting means generally referred to by the reference numeral 32, and second rack supporting means generally referred to by the reference numeral 30.

The rack structure 28 defines a generally tray-shaped member including upstanding opposite side and opposite end peripheral walls 34 and 36, respectively, secured together at adjacent ends and having a stiff bottom wall 38 secured and extending between the lower marginal edge portions thereof. The bottom wall 38 may be of substantially solid panel-like configuration but the bottom wall 38 of the embodiment illustrated is in the form of a stiff screen panel.

The first rack supporting means 32 includes four mounting brackets generally referred to by the reference numerals 40 which each includes an angular base portion 42 comprising a horizontal leg 44 terminating at one end in a downturned leg 46. The mounting brackets 40 are to be disposed adjacent the four corners of the rack structure 28 with the horizontal legs 44 thereof overlying adjacent portions of the roof or top 22 and the downturned legs 46 thereof extending downwardly over the corresponding side portion of the top 22 and seated in the adjacent rain gutter 24, see FIGURE 4. The ends of each of the horizontal legs 44 remote from the corresponding downturned leg 46 terminates in an upstanding leg 48 projecting upwardly through an opening 50 provided therefor in the adjacent portion of the screen panel 38 and terminates at its upper end in a horizontally directed and outturned leg 52, which in turn terminates at its free end in a downturned flange 54.

From FIGURE 4 of the drawings it may be seen that each of the mounting brackets is hooked over the corresponding peripheral wall of the rack structure 28. In addition, it may also be seen from FIGURE 4 of the drawings that the rack structure 28 includes a depending wheel assembly generally referred to by the reference numeral 56 disposed adjacent and outwardly of each opening and supported from the portion of the screen panel 38 disposed immediately thereabove. In addition, each of the depending wheel assemblies may also be at least partially supported from the corresponding peripheral wall of the rack structure 28. Each wheel assembly includes a journalled roller 58 which rests upon the upper surface of the corresponding horizontal leg 44 and the legs 44 are each provided with a pair of stationary abutment blocks 60 between which the corresponding wheel 58 is received for preventing shifting of the rack structure 28 relative to the mounting brackets 40.

From FIGURE 4 of the drawings it may further be seen that each of the flanges 54 has one end of an elongated rod 62 secured thereto and comprising a part of a turnbuckle assembly generally referred to by reference numeral 64 including a similar rod 66 provided with a hooked free end portion 68 removably engaged with a C-shaped anchor 70 hooked under the corresponding rain gutter 24. Accordingly, it may be seen that the turnbuckle assemblies 64 serve not only to anchor the mounting brackets 40 to the top 22 but also the rack structure 28 to the mounting bracket 40 against shifting relative to the latter.

With attention now invited more specifically to FIGURES 1 and 3 of the drawings it may be seen that the second rack supporting means 30 includes a first pair of rail members or sections 72 secured to the load bed 12 in any convenient manner such as by fasteners 74 spaced longitudinally thereof. Each of the rail members or track members 72 defines an upwardly opening groove 76 in which the wheels 58 on the corresponding side of the rack structure 28 are receivable and along which the wheels 58 may roll. The forward ends of the grooves 76 are closed as at 78 and the rear ends of the rail members 72 terminate a spaced distance forwardly of the rear end of the load bed 12.

The second rack suporting means 30 also includes a second pair of rail members 80 which are secured to the inner surface 20 of the tail gate 14 in any convenient manner such as by fasteners 82 and which have grooves 84 formed therein corresponding to the grooves 76. The rear ends of the grooves 84 are closed as at 86 and the forward ends of the rail members 80 have rail member sections 88 pivotally supported therefrom by means of pivot pins 90. The rail member sections 88 are provided with grooves 92 which form continuations of the grooves 84 when the rail section member sections 88 are in the solid line positions illustrated in FIGURE 1 of the drawings bridging the space 94 between the load bed 12 and the inner surface 20 of the tail gate 14. Further, the free ends of the sections 88 are aligned with the rear ends of the rail members 72 when the sections 88 are in the solid line positions illustrated in FIGURE 1 of the drawings and therefore when the tail gate 14 is open and the rail sections 88 are bridging the spacing or space 94 in a manner illustrated in FIGURE 1 of the drawings, the rack structure 28 may be rolled from within the station wagon 10 rearwardly to a position at least partially supported by the rail members 80 and providing ready access to any material supported from the rack structure 28 by a person disposed alongside the lowered tail gate 14.

Still further, it may be seen from FIGURE 3 of the drawings that removable abutment members 96 are provided and include anchoring projections 98 receivable in apertures 100 formed in the rear ends of the rail members 72 behind the rearmost wheels 58 when the rack structure 28 is disposed in its forwardmost position on the rail members 72 with its forward wheels 58 abutting the closed ends of the groove 76. In this manner, the rack structure 28 may be stationarily positioned within the station wagon 10 against movement longitudinally of the rail members 72.

Of course, when it is desired to use the interior of the station wagon 10 for supporting loads in addition to the load in the rack structure 28, the rack structure 28 may be removed from within station wagon 10 and have the mounting brackets 40 attached thereto. Thereafter, the rack structure 28, with the mounting brackets 40 attached thereto, may be positioned on the top 22 in the manner illustrated in FIGURES 2 and 4 of the drawings and the turnbuckles 64 may be utilized to anchor the rack structure 28 as well as the mounting bracket 40 in position on the top 22 in a manner which is believed to be obvious.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. In combination with a vehicle including a top, a detachable storage rack assembly including a rack structure and rack supporting means secured to said top, said rack structure and rack supporting means including coacting means operative to selectively removably support said rack structure from said rack supporting means against movement relative thereto, said coacting means including means operative to releasably secure said rack structure to said rack supporting means and the latter to said top, said coacting means including projecting arm portions carried by said rack supporting means and overlying adjacent portions of said rack structure and adjustable length tension members secured to the free ends of said arm portions at one set of corresponding ends thereof and removably secured to said top at the other set of corresponding ends thereof, said rack structure defining a tray-like member, said rack supporting means including opposite side brackets each including a generally horizontally disposed flange portion adapted to overlie a corresponding side portion of said top and terminating at one end in a downwardly curving end portion for seated engagement in the corresponding rain gutter and terminating at the other end portion in an upstanding flange portion projecting upwardly through an adjacent portion of the bottom of said tray-like member and inturn terminating at its upper end in an outwardly directed flange portion defining one of said arm portions.

2. The combination of claim 1 wherein said adjustable length tension members comprise turnbuckle members.

3. The combination of claim 1 wherein said vehicle includes an inner rear floor portion, second rack supporting means comprising a pair of elongated track members secured to said floor portion and with which said rack structure is removably engageable for guided movement longitudinally therealong.

4. The combination of claim 1 wherein said rack structure includes supporting rollers dependingly supported therefrom and selectively engageable with said rack supporting means for support therefrom.

5. The combination of claim 4 wherein said rack supporting means includes means engageable with said rollers for preventing relative movement between said rack supporting means and said rack structure.

6. The combination of claim 1 wherein said vehicle includes an inner rear floor portion comprising a load bed having a hinged tail gate at its rear end, second rack supporting means including a pair of elongated track members secured to said load bed and with which said rack structure is removably engageable for guided movement longitudinally therealong, said second rack supporting means also including a pair of elongated rail members adapted for securement to the inner surface of the tail gate of said station wagon in position to form continuations of said track members when said tail gate is in the lowered position with said inner surface generally horizontally aligned with said load bed.

7. The combination of claim 6 wherein said rail members include rail member sections movably supported therefrom for movement between retracted out of the way positions and extended operative positions adapted to form bridging members between the adjacent ends of said track and rail members when said tail gate is in lowered position.

References Cited

UNITED STATES PATENTS

| | | | |
|---|---|---|---|
| 2,792,137 | 5/1957 | Solomon et al. | 214—83.24 |
| 3,004,678 | 10/1961 | Golaski | 224—42.01 |
| 3,104,042 | 9/1963 | Gaus | 224—42.1 |

GERALD M. FORLENZA, *Primary Examiner.*

R. J. SPAR, *Assistant Examiner.*